United States Patent
Honda et al.

(10) Patent No.: US 6,395,336 B1
(45) Date of Patent: May 28, 2002

(54) PROCESS FOR IMPROVING THE CORROSION RESISTANCE OF A METAL SURFACE

(75) Inventors: Takumi Honda, Hiratsuka; Mutsumi Yanagi, Sagamihara, both of (JP)

(73) Assignee: Henkel Corporation, Gulph Mills, PA (US)

( * ) Notice: Subject to any disclaimer, the term of this patent is extended or adjusted under 35 U.S.C. 154(b) by 0 days.

(21) Appl. No.: 09/600,368

(22) PCT Filed: Jan. 13, 1999

(86) PCT No.: PCT/US99/00377

§ 371 (c)(1),
(2), (4) Date: Jul. 14, 2000

(87) PCT Pub. No.: WO99/36192

PCT Pub. Date: Jul. 22, 1999

(30) Foreign Application Priority Data

Jan. 14, 1998 (JP) ............................... 10-006078

(51) Int. Cl.⁷ ............................... B05D 1/36; B05D 7/14
(52) U.S. Cl. ..................................... 427/340; 427/388.4
(58) Field of Search ............................. 427/340, 388.4

(56) References Cited

U.S. PATENT DOCUMENTS

| | | | |
|---|---|---|---|
| 3,585,084 A | 6/1971 | Steinbrecher et al. | 148/6.2 |
| 3,795,546 A | 3/1974 | Hall et al. | 148/6.2 |
| 4,874,673 A | 10/1989 | Donovan et al. | 428/463 |
| 4,942,061 A | * 7/1990 | Domes | |
| 5,164,234 A | 11/1992 | Siebert | 427/419.8 |
| 5,342,694 A | 8/1994 | Ahmed et al. | 428/461 |
| 5,667,845 A | * 9/1997 | Roberto et al. | |

FOREIGN PATENT DOCUMENTS

| | | | |
|---|---|---|---|
| CS | 233998 | * | 12/1986 |
| GB | 1130687 | | 10/1968 |
| JP | 47017630 | | 2/1972 |
| JP | 50-033940 | * | 4/1975 |
| JP | 52021006 | | 6/1977 |
| JP | 52068240 | | 6/1977 |
| JP | 54013435 | | 5/1979 |
| JP | 61168673 | | 7/1986 |
| JP | 03505841 | | 12/1991 |
| JP | 05186889 | | 7/1993 |

* cited by examiner

Primary Examiner—Erma Cameron
(74) Attorney, Agent, or Firm—Wayne C. Jaeschke; Stephen D. Harper; Norvell E. Wisdom, Jr.

(57) ABSTRACT

A resin coating is formed on a metal surface using an aqueous autodepositing resin composition that contains oxidizing agent, acid, and carboxyl-functional and/or hydroxyl-functional water-dispersible or water-soluble resin and, optionally, metal ions; the resulting coating, while still in its uncured condition, is subject to post-treatment with an aqueous solution containing from 0.5 to 5.0 g/L of amine and from 10 to 100 g/L (solids) of water-soluble amino resin molecules that bear at least two alkoxymethylamino, methylolamino, and/or imino groups; and the coating is then dried and cured. This provides a highly anticorrosive coating on the metal, and contrary to an analogous process in which the post-treatment solution contains amino resin but not amine, the post-treatment solution remains stable and provides continuing high quality coating performance even after a considerable amount of metal surface per unit volume of post-treatment solution has been processed.

12 Claims, No Drawings

PROCESS FOR IMPROVING THE CORROSION RESISTANCE OF A METAL SURFACE

FIELD OF THE INVENTION

This invention relates to a method for coating metal surfaces in order to impart corrosion resistance thereto. More particularly, the invention relates to a method for the anticorrosion coating of metal surfaces in which a resin coating is formed on a metal surface using an autodepositing resin composition and the resulting resin coating is post-treated while still in its uncured condition in order to improve the corrosion resistance and adherence of the resin coating.

BACKGROUND OF THE INVENTION AND RELATED ART

Resin compositions that have the ability to form a resin coating on a metal surface by contact between the metal surface and an acidic aqueous autodeposition composition containing an organic coating-forming resin are already known in the art. Various examples thereof are taught in Japanese Published Patent Application (Kokoku or Examined) Number Sho 47-17630 (17,630/1972), Japanese Published Patent Application (Kokoku or Examined) Number Sho 52-21006 (21,006/1977), Japanese Published Patent Application (Kokoku or Examined) Number Sho 54-13435 (13,435/1979), and Japanese Patent Application Laid Open (Kokai or Unexamined) Number Sho 61-168673 (168,673/1986). A characteristic feature of these known resin coating compositions is that their contact with a suitable clean metal surface results in the formation of a resin coating whose thickness or weight increases with the time of contact. In addition, since coating formation in this technology is achieved by the chemical activity of the resin composition at the metal surface (metal ions eluted from the metal surface by etching are believed to act on the resin particles to induce deposition thereof on the metal surface), this technology can be distinguished from electrodeposition by its ability to efficiently form a resin coating on metal surfaces without the external application of electricity to the metal on which the coating is formed.

However, the coatings afforded by the prior-art autodepositing resin compositions have not always evidenced a satisfactory corrosion resistance or adherence. This has resulted in the development of a variety of tactics for engendering additional improvements in the corrosion resistance and adherence of the autodeposited resin coating residing on the metal surface. For example, a number of different methods are known in which the still uncured autodeposited resin coating is subjected to a chemical treatment (post-treatment).

U.S. Pat. No. 3,795,546 teaches that the post-drying corrosion resistance of the resin coating can be improved by exposing the uncured autodeposited resin coating prior to its thermal drying to an aqueous solution that contains approximately 2.5 to 50 g/L polyacrylic acid and hexavalent chromium. However, environmental pollution considerations make it desirable to avoid the use of chromium-containing treatment baths.

Japanese Patent Application Laid Open (Kokai or Unexamined) Number Sho 52-68240 (68,240/1977) teaches that the post-drying corrosion resistance of the resin coating can be improved by exposing the uncured autodeposited resin coating prior to its thermal drying to an aqueous dispersion or aqueous solution whose base component is 5 to 100 g/L nitrogenous organic compound, for example, at least 1 selection from the group consisting of amines, the amine salts of carboxylic adds, amino acids, melamine, and amides.

The post-treatment of autodeposited resin coatings with a nitrogenous organic compound is an effective means for improving the corrosion resistance and adherence of the ultimately obtained resin coating. However, since autodeposition coating is typically implemented by dipping or immersion, the acid component and/or metal ions component (for example, the iron ions) present in the uncured autodeposited resin coating will elute into the treatment solution used as the post-treatment agent (the post-treatment solution). Since this will frequently cause a loss of stability of the post-treatment solution, this approach may not always be acceptable when viewed from the perspective of producing a resin coating that evidences a continuously stable product quality.

PROBLEM(S) TO BE SOLVED BY THE INVENTION

The present invention provides a method for the anticorrosion coating of metal surfaces that produces an excellent adherence and resistance to corrosion and that maintains its ability to generate these properties even after its post-treatment solution has been used to treat a substantial amount of metal surface.

BRIEF SUMMARY OF THE INVENTION

It has been discovered that a high-quality autodeposited resin coating can be obtained by forming an uncured resin coating on a metal surface by bringing the metal surface into contact with an autodepositing coating composition; by then executing a post-treatment on the uncured resin coating prior to its thermal drying using a post-treatment solution that contains as its essential components a water-soluble amino resin bearing specific reactive functional groups and an amine compound; and by thereafter drying and curing the post-treated resin coating.

DETAILED DESCRIPTION OF THE INVENTION

A process according to the present invention for the anticorrosion coating of metal surfaces characteristically comprises operations of:

(I) forming an adherent wet uncured resin coating on a metal surface by bringing the metal surface into contact with an aqueous autodepositing resin composition that contains oxidizing agent, acid, and water-dispersible or water-soluble organic resin, said resin containing a product of the polymerization of at least one selection from carboxyl-functional condensation polymerizable monomers and hydroxyl-functional condensation polymerizable monomers;

(II) subjecting the resulting uncured resin coating to a post-treatment by bringing the aforesaid resin coating, while it is still in its uncured condition, into contact with an aqueous solution that contains:

from 10 to 100, or more preferably from 20 to 50, grams per liter, hereinafter usually abbreviated as "g/L", of water-soluble amino resin that bears in each molecule at least two reactive functional groups selected from the alkoxymethylamino, methylolamino, and imino groups; and from 0.5 to 5.0 g/L, or more preferably from 1.0 to 2.0 g/L, of at least one organic amine compound that does not contain more than 20, or, with increasing preference in the order given, not more than 18, 16, 14, 12, 10, or 8 carbon atoms per molecule; and (III) subjecting the resin coating afforded by operation (II) as described immediately above to drying and curing.

The solution for the post-treatment of aqueous autodepositing resin compositions according to the present invention preferably contains its water soluble amino resin and its other amine compound as described above in a weight ratio from 2.0:1.0 to 200:1.0, or more preferably from 5.0:1.0 to 50:1.0.

When the post-treatment agent and post-treatment solution contain less than the specified amount of water-soluble amino resin, the ultimately obtained resin coating will usually exhibit an inadequate corrosion resistance and adherence. The effects provided by the water-soluble amino resin do not increase at amounts in excess of the specified upper limit, and such amounts are also problematic because they cause the content of the amine compound to be too low on a relative basis. More specifically, a too low content of amine compound causes the resulting post-treatment solution to have an unsatisfactory stability during continuous use; this results in variations in the quality of the resin coating product. A too high content of the amine compound causes the content of the water-soluble amino resin to be too low on a relative basis, resulting in an unsatisfactory corrosion resistance and adherence.

Each molecule of the water-soluble amino resin used by the present invention preferably contains at least two reactive functional groups represented by at least one OF the following chemical moiety formulas (1), (2), and (3):

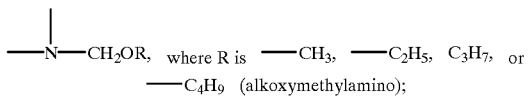

(1)

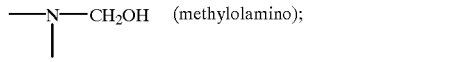

(2)

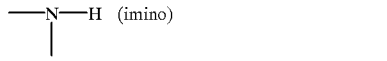

(3)

The water-soluble amino resin used in the present invention can be selected from methylated melamine resins (the degree of methylation is not critical and highly methylated melamine resins and partially methylated melamine resins can be used), imino-type methylmelamine resins, imino-type methylated melamine resins, methylolated melamine resins, benzoguanamine resins, and glycoluryl resins.

The amine compound in the post-treatment agent and post-treatment solution used in the present invention can be selected from the group consisting of monoalkylamines, dialkylamines, trialkylamines, monoalkenylamines, dialkenylamines, trialkenylamines, monoalkanolamines, dialkanolamines, and trialkanolamines, as preferably exemplified by ethylamine, propylamine, isopropylamine, butylamine, dimethylamine, diethylamine, dipropylamine, dibutylamine, triethylamine, tripropylamine, allylamine, diallylamine, triallylamine, dimethylethanolamine, diethylethanolamine, ethanolamine, diethanolamine, and triethanolamine. Each of the alkyl, alkenyl, and alkanol groups in the subject alkylamines, alkenylamines, and alkanolamines independently preferably contains from 1 to 15 carbon atoms, or more preferably, with increasing preference in the order given, not more than 10, 8, 6, or 4 carbon atoms.

The amine compound used in the post-treatment solution in a method according to the present invention for the anticorrosion coating of metal surfaces is most preferably selected from the group consisting of ethylamine, propylamine, isopropylamine, butylamine, dimethylamine, diethylamine, dipropylamine, dibutylamine, triethylamine, tripropylamine, allylamine, diallylamine, triallylamine, dimethylethanolamine, diethylethanolamine, ethanolamine, diethanolamine, and triethanolamine.

The post-treatment solution used in the present invention may also optionally contain one or more ammonium salts. Preferred ammonium salts can be selected from those taught in Japanese Patent Application Laid Open (Kokai or Unexamined) Number Hei 3-505841 (505,841/1991) and Japanese Patent Application Laid Open (Kokai or Unexamined) Number Hei 5-186889 (186,889/1993), for example, ammonium bicarbonate and ammonium hydroxide.

The aqueous autodepositing resin composition used in the method of the present invention contains metal ions, oxidizing agent, acid, and water-dispersible or water-soluble coating-forming organic resin that contains the product of the polymerization of at least one selection from carboxyl-functional monomers and hydroxyl-functional monomers.

Carboxyl-functional monomers employed in the production of the coating-forming organic resin used in a method according to the present invention are ethylenically unsaturated carboxylic acid monomers, for example, acrylic add, methacrylic acid, maleic acid, itaconic acid, and fumaric acid. Hydroxyl-functional monomers employed in the production of the coating-forming organic resin used by the method according to the present invention are ethylenically unsaturated hydroxylated monomers, for example, 2-hydroxyethyl acrylate, 2-hydroxypropyl acrylate, 2-hydroxyethyl methacrylate, 2-hydroxypropyl methacrylate, hydroxybutyl acrylate, and hydroxybutyl methacrylate. In addition to the carboxyl-functional monomers and hydroxyl-functional monomers, the polymerization that produces the coating-forming organic resin used in the method according to the present invention may also employ one or more other ethylenically unsaturated monomers. These other ethylenically unsaturated monomers can be selected from, for example, methyl acrylate, ethyl acrylate, n-butyl acrylate, 2-ethylhexyl acrylate, methyl methacrylate, ethyl methacrylate, and n-butyl methacrylate.

The film-forming organic resin used in the method according to the present invention can also be selected from polyester polyol compounds as afforded by the polyesterification of polyhydric alcohol molecules bearing at least two hydroxyl groups each with organic acid molecules bearing at least two carboxyl groups each. The former are exemplified by ethylene glycol, propylene glycol, and 1,6-hexanediol, while the latter can be exemplified by phthalic acid, isophthalic acid, and terephthalic acid. The coating-forming organic resin used by the method according to the present invention will comprise at least one selection from the above-described polymers, copolymers, and polyester polyols.

While the molecular weight of the coating-forming organic resin used in the invention method is not critical, molecular weights of, for example, 20,000 to 1,000,000 are preferred and molecular weights of 100,000 to 1,000,000 are particularly preferred. This molecular weight can be measured by gel permeation chromatography in tetrahydrofuran using polyethylene or polyacrylate ester as the reference material.

The coating-forming organic resin employed by the invention is preferably used in the form of an aqueous emulsion, which in many cases can be prepared by a conventional emulsion polymerization technique. However, this aqueous emulsion can also be prepared by taking a coating-forming organic resin prepared by another polymerization technique and emulsifying the resin in water.

On the subject of the resin emulsion as afforded by emulsion polymerization, the polymerization conditions used therefor are not critical and the usual methodologies can be employed for this emulsion polymerization. For example, an emulsion of the coating-forming resin can be prepared by running a polymerization reaction in a mixture comprising at least water, anionic and/or nonionic surfactant, monomer for the resin component as described above, and polymerization initiator.

The autodepositing resin composition used by the present invention can be prepared by mixing coating-forming organic resin obtained as described above, acid, oxidizing agent, and optionally a compound capable of furnishing metal ions and by then also adding water as necessary or desired.

The acid used in the subject autodepositing resin composition preferably is at least one selection from fluorozirconic acid, fluorotitanic acid, fluorosilicic acid, fluoroboric acid, hydrofluoric acid, phosphoric acid, and nitric acid. The use of hydrofluoric acid is most preferred.

The oxidizing agent preferably is hydrogen peroxide, potassium permanganate, or sodium nitrite; the use of hydrogen peroxide is most preferred.

The compound capable of furnishing metal ions is not critical as long as this compound is stable in the resin composition. This compound preferably is ferric fluoride, ferric nitrate, ferrous phosphate, or cobaltous nitrate, with ferric fluoride being most preferred.

The aqueous autodepositing resin composition used by the method of the present invention preferably contains from 5 to 550 g/L and more preferably from 50 to 100 g/L of the above-described coating-forming organic resin, in each case measured as the concentration of resin solids. The acid concentration is preferably from 0.1 to 5.0 g/L and more preferably from 0.5 to 3.0 g/L, and the oxidizing agent concentration is preferably from 0.01 to 3.0 g/L and more preferably from 0.03 to 1.0 g/L. A metal ions source compound need not be present, but the use of this compound is preferred, in which event its concentration is preferably no greater than 50 g/L and more preferably is from 1.0 to 5.0 g/L.

The aqueous autodepositing resin composition used in a method of the present invention may contain optional components in addition to the components described above. Thus, this composition may contain a coalescing agent such as, for example, trialkylpentanediol isobutyrate or alkyl carbitol, and pigment such as, for example, carbon black, phthalocyanine blue, phthalocyanine green, quinacridone red, Hansa yellow, and benzidine yellow. The coalescing agent functions to lower the minimum temperature for coating formation during formation of the deposited resin coating and thereby further facilitates melt-bonding of the deposited resin.

The technique for effecting contact between the metal surface and the aqueous autodepositing resin composition is not critical to the method according to the present invention. Dipping, applicator methods, and spraying can be used, with dipping being preferred. Nor are the treatment temperature and treatment time critical to the instant method. In the case of dipping, the metal stock is generally preferably dipped in the composition at room temperature, for example, 18 to 25° C., for from 30 to 300 seconds and preferably from 90 to 180 seconds.

The extent of resin coating formation on the metal surface is also not critical, but dried film thicknesses of 10 to 40 micrometers are preferred and dried film thicknesses of 20 to 30 micrometers are particularly preferred. As a general matter the metal surface is preferably degreased and then rinsed with water prior to its contact with the resin composition.

One of the most significant features of the invention is the excellent stability of the post-treatment solution. If the amino resin component were used by itself, the hydrofluoric acid (acid component) and iron ions (metal ions) eluting and admixing into the post-treatment solution during post-treatment of the resin coating with the post-treatment solution would cause the coagulation of the water-soluble amino resin component present in the post-treatment solution and hence would cause a substantial decline in the stability of the post-treatment solution. This in turn would lead to variations in the quality of the post-treated coating. However, the amino compound present in the treatment solution, which can neutralize the eluting acid component and complex the iron ions, inhibits adverse effects on the water-soluble amino resin and stabilizes the post-treatment solution.

With regard to the process conditions in the post-treatment process of the method of the invention, the temperature of the post-treatment solution is preferably from 10 to 40° C. as a general rule and is particularly preferably from 20 to 25° C., and the treatment time is preferably in the range from 20 to 180 seconds. Solution temperatures below 10° C. result in a pronounced tendency for the resin coating to crack during the thermal drying step, while temperatures in excess of 40° C. tend to produce an undesirable appearance of the coating due to a pronounced tendency for the coating to whiten after thermal drying. The effects from the post-treatment normally will be inadequate at treatment times of less than 20 seconds, while treatment times greater than 180 seconds have a tendency to impair the adherence of the coating and the uniformity of appearance of the coating.

After the post-treatment process as described hereinabove the resin coating is submitted to drying and curing. The conditions used in the drying and curing process will vary as a function of the type of coating-forming organic resin used in the autodepositing resin composition, but thermal drying will generally be carried out at from 110 to 200° C. for a time that is from 5 to 30 seconds.

This invention will be illustrated in greater detail below by working and comparative examples.

Examples of Synthesis of Coating-forming Organic Resins

"Resin (A)"

A monomer component of 5 parts of methacrylic acid, 5 parts of 2-hydroxyethyl methacrylate, 12 parts of styrene, 40 parts of acrylonitrile, and 38 parts of ethyl acrylate was mixed with 1 part of acrylate ester-type reactive surfactant, 0.3 part of ammonium persulfate, and 398.7 parts of water. The resulting mixture was emulsion-polymerized at 75° C. to give a coating-forming organic Resin (A) with a resin solids content of 20%.

"Resin (B)"

A monomer component of 8 parts of methacrylic acid, 12 parts of methyl methacrylate, 40 parts of acrylonitrile, 20 parts of ethyl acrylate, and 20 parts of butyl acrylate was mixed with 1 part of acrylate ester-type reactive surfactant, 0.3 part of ammonium persulfate, and 398.7 parts of water. The resulting mixture was emulsion-polymerized at 75° C. to give a coating-forming organic Resin (B) with a resin solids content of 20%.

Examples of Preparation of Post-treatment Solutions
"Post-treatment Solution (A)"

A methylol-functional water-soluble resin (solids=88%, a partially methylated melamine-formaldehyde resin from Mitsui Cytec Ltd.) was dissolved in deionized water so as to provide a resin concentration of 10 g/L. Triethanolamine was added to the resulting solution so as to give a triethanolamine concentration of 0.2 g/L. The solution was then brought to a total of 1 liter with deionized water to give Post-treatment Solution (A).

"Post-treatment Solutions (B) to (G)"

Post-treatment Solutions (B) to (G) were each prepared as described for Post-treatment Solution (A), but using the components and component additions reported in Table 1 below.

Process Examples and Comparison Examples

EXAMPLE 1

Preliminarily cleaned cold-rolled steel sheets (70×150×1 millimeters, hereinafter usually abbreviated as "mm") were coated by dipping for 180 seconds into a treatment bath comprising Autodepositing Resin Composition (1) described below while the bath temperature was maintained at 20 to 22° C. After a water rinse, the resulting uncured autodeposited resin coating was then dipped in Post-treatment Solution (A) at 24° C. followed by drying in a convection oven for 180° C. for 20 minutes. The coated sheet afforded thereby was subsequently tested for coating performance.

Coalescing agent (A) was trialkylpentanediol isobutylate. Its addition caused the minimum coating-forming temperature of the resulting composition (1) to become about 20° C.

EXAMPLE 2

A resin-coated sheet was prepared generally as described in Example 1, but in this example the uncured autodeposited resin coating afforded by Autodepositing Coating Composition (1) was dipped at 24° C. in Post-treatment Solution (B) with the composition reported in Table 1. This was followed by drying in a convection oven at 180° C. for 20 minutes and submission to the various coating performance tests.

EXAMPLE 3

A resin-coated sheet was prepared generally as described in Example 1, but in this example coating was run using Autodepositing Coating Composition (2) with the composition described below. The resulting uncured autodeposited resin coating was dipped at 24° C. in Post-treatment Solution (C) with the composition reported in Table 1 This was followed by drying in a convection oven at 180° C. for 20 minutes and submission to the various coating performance tests.

TABLE 1

| Identifying Letter for Post-treatment Solution | g/L in Post-treatment Solution of Amino Resin Type: | | g/L in Post-treatment Solution of Amine Type: | | Coating Thickness, μm | % Remaining in Adhesion Test | | Creep in mm after Corrosion Test |
|---|---|---|---|---|---|---|---|---|
| | PMMR | HMMR | Diethanolamine | Triethanolamine | | Pre-Immersion | Post Immersion | |
| A | 0 | 10.0 | 0 | 0.2 | 25 | 100 | 100 | 7.0 |
| B | 80.0 | 0 | 0.2 | 1.0 | 30 | 100 | 100 | 5.0 |
| C | 40.0 | 0 | 0 | 2.0 | 28 | 100 | 100 | 6.0 |
| D | 20.0 | 0 | 0 | 4.0 | 32 | 100 | 100 | 6.0 |
| E | 40.0 | 0 | 0 | 0 | 27 | 100 | 100 | 6.0 |
| F | 80.0 | 0 | 0 | 6.0 | 33 | 100 | 50 | 15.0 |
| G | 10.0 | 0 | 0 | 0.05 | 24 | 100 | 100 | 7.0 |
| H | No post-treatment | | | | 25 | 100 | 100 | Overall rust |

Abbreviations for Table 1
"PMMR" means "partially methylated melamine resin" (88% solids, from Mitsui Cytec Ltd.).
"HMMR" means "highly methylated melamine resin" (100% solids, from Mitsui Cytec Ltd.).
"μm" means "micrometres".

Autodepositing Coating Composition (1)

| Component | Amount Blended (g/L) |
|---|---|
| Resin (A) | 250.00 |
| Coalescing Agent (A) | 4.00 |
| Hydrofluoric acid | 1.00 |
| Ferric fluoride | 3.00 |
| Hydrogen peroxide | 0.10 |
| Deionized water | amount sufficient to make a total of 1 liter |

Autodepositing Coating Composition (2)

| Component | Amount Blended (g/L) |
|---|---|
| Resin (B) | 250.00 |
| Coalesing Agent (A) | 5.00 |
| Hydrofluoric acid | 1.00 |
| Ferric fluoride | 3.00 |
| Hydrogen peroxide | 0.10 |
| Deionized water | amount sufficient to make a total of 1 liter |

EXAMPLE 4

A resin-coated sheet was prepared generally as in Example 1, but in this example using the Autodepositing Coating Composition (3) with the composition described below prepared using a water-based autodepositing polyester resin (brand name: Aronmelt, 30% solids, from Toa Gosei Co., Ltd.). The resulting uncured autodeposited resin coating was dipped at 24° C. in Post-treatment Solution (D) with the composition reported in Table 1. This was followed by drying in a convection oven at 180° C. for 20 minutes and submission to the various coating performance tests.

| Autodepositing Coating Composition (3) | |
|---|---|
| Component | Amount Blended (g/L) |
| Water-based polyester resin | 165.00 |
| Hydrofluoric acid | 1.00 |
| Ferric fluoride | 3.00 |
| Hydrogen peroxide | 0.10 |
| Deionized water | amount sufficient to make a total of 1 liter |

Comparative Examples 1 to 3

Resin-coated sheets were prepared generally as described in Example 3, but using the above-described Autodepositing Coating Composition (2). The resulting uncured autodeposited resin coatings were dipped at 24° C. in one of the Post-treatment Solutions (E) to (G) with the compositions reported in Table 1. This was followed by drying in a convection oven at 180° C. for 20 minutes and submission to the various coating performance tests.

Comparative Example 4

A resin-coated sheet was prepared generally as in Example 1 using the above-described autodepositing coating composition (1). The resulting uncured autodeposited resin coating was then dried, without post-treatment, in a convection oven at 180° C. for 20 minutes and submitted to the various coating performance tests.

The coating performance tests were as follows.
(1) Coating Thickness

The thickness was measured at three locations (upper, middle, and lower regions) on the sample sheet, and the average of these values is reported in Table 1.
(2) Adherence (Crosshatch/tape Peel Test)

The test coupon was immersed in warm water (40° C.) for 240 hours. Both before and after this immersion, a 100-square grid (1-mm intervals) was scribed in the test coupon, pressure-sensitive adhesive tape was applied to the grid, the tape was peeled off, and the number of remaining squares of the coating was counted. The results before and after immersion are reported in Table 1.
(3) Corrosion Resistance A cross was scribed in the resin coating of the test coupon to the basis metal, and the scribed coupon was subjected to salt-spray exposure for 240 hours (according to Japanese Industrial Standard Z-2371). The width of the rust or blistering produced at the scribed cross was measured post-exposure (maximum for both sides, in mm).

Evaluation of the Stability of the Post-treatment Solution After Use

In each of Examples 1 to 4 and Comparative Examples 1 to 3, the resin coating composition (uncured) was subjected to post-treatment at the rates of 0.05, 0.5, 1.0, and 2.0 square meters (hereinafter usually abbreviated as "$m^2$") of surface area per 1 liter (hereinafter usually abbreviated as "L") of post-treatment solution. After use each post-treatment solution was held for 1 week at room temperature and the character of the solution was then visually evaluated. The results are reported in Table 2, using the following scale:

| | |
|---|---|
| ++ | no abnormalities |
| + | turbidity has appeared |
| × | solids have appeared |

Post-treatment was run in Examples 2 and 3 at the rate of 2.0 $m^2$ of surface area per 1 L of post-treatment solution, and the resulting resin coatings were submitted to the coating performance tests described above.

TABLE 2

| Post-treatment Solution Identifying Letter | Stability of Post-treatment Solution after Use for | | | |
|---|---|---|---|---|
| | 0.05 $m^2$/L | 0.5 $m^2$/L | 1.0 $m^2$/L | 2.0 $m^2$/L |
| A | ++ | ++ | ++ | + |
| B | ++ | ++ | ++ | ++ |
| C | ++ | ++ | ++ | ++ |
| D | ++ | ++ | ++ | ++ |
| E | × | not measured | not measured | not measured |
| F | ++ | ++ | ++ | ++ |
| G | ++ | + | × | not measured |

The results are reported in Table 3.

TABLE 3

| Identifying Letter for Post-treatment Solution | Performance Test Results for: | | | |
|---|---|---|---|---|
| | Coating Thickness, μm | % Remaining in Adhesion Test | | Creep in mm after Corrosion Test |
| | | Pre-Immersion | Post Immersion | |
| B | 28 | 100 | 100 | 5.0 |
| C | 26 | 100 | 100 | 6.0 |

As the results reported in Tables 1 to 3 make clear, the post-treatment solutions used in Examples 1 to 4, which employed the method according to the present invention, were very stable and afforded highly corrosion-resistant and strongly adherent resin coatings. In contrast, the resin coatings afforded by Comparative Examples 1 to 3 gave unsatisfactory results for at least one property from among corrosion resistance, adherence, and stability of the post-treatment solution.

Benefits of the Invention

The method according to the present invention for the anticorrosion coating of metal surfaces, through its use of the specific post-treatment solution according to the present invention, provides a highly corrosion-resistant and strongly adherent autodeposited resin coating and does so at a continuously stable quality level. The post-treatment solution used in the method of the invention is very stable and can therefore be used for the continuous post-treatment of resin coatings.

What is claimed is:
1. A process for improving the corrosion coating of a metal surface, said process comprising operations of:
(I) forming an adherent wet uncured resin coating on a metal surface by bringing the metal surface into contact with an aqueous autodepositing resin composition that contains oxidizing agent, acid, and water-dispersible or water-soluble organic resin, said resin containing a product of the polymerization of at least one selection from carboxyl-functional condensation polymerizable monomers and hydroxyl-functional condensation polymerizable monomers;

(II) subjecting the resulting uncured resin coating to a post-treatment by bringing the aforesaid resin coating, while it is still in its uncured condition, into contact with a post-treatment aqueous solution that contains the following components:

(A) from 10 to 100 g/L of water-soluble amino resin that bears in each molecule at least two reactive functional groups selected from the alkoxymethylamino, methylolamino, and imino groups; and (B) from 0.5 to 5.0 g/L of at least one organic amine compound that does not contain more than 20 carbon atoms per molecule; and (III) subjecting the resin coating afforded by operation (II) as described immediately above to drying and curing.

2. A process according to claim 1, wherein the concentration of component (A) in the post-treatment aqueous solution has a ratio to the concentration of component (B) in the same solution that is from 2.0:1.0 to 200:1.0.

3. A process according to claim 2, wherein said concentration ratio is from 10:1.0 to 50:1.0.

4. A process according to claim 3, wherein the concentration of component (A) in the post-treatment solution is from 20 to 50 g/L and the concentration of component (B) in the post-treatment solution is from 1.0 to 2.0 g/L.

5. A process according to claim 2, wherein the concentration of component (A) in the post-treatment solution is from 20 to 50 g/L and the concentration of component (B) in the post-treatment solution is from 1.0 to 2.0 g/L.

6. A process according to claim 1, wherein the concentration of component (A) in the post-treatment solution is from 20 to 50 g/L and the concentration of component (B) in the post-treatment solution is from 1.0 to 2.0 g/L.

7. A process according to claim 6, wherein component (B) of the post-treatment solution is selected from the group consisting of ethylamine, propylamine, isopropylamine, butylamine, dimethylamine, diethylamine, dipropylamine, dibutylamine, triethylamine, tripropylamine, allylamine, diallylamine, triallylamine, dimethylethanolamine, diethylethanolamine, ethanolamine, diethanolamine, and triethanolamine.

8. A process according to claim 5, wherein component (B) of the post-treatment solution is selected from the group consisting of ethylamine, propylamine, isopropylamine, butylamine, dimethylamine, diethylamine, dipropylamine, dibutylamine, triethylamine, tripropylamine, allylamine, diallylamine, triallylamine, dimethylethanolamine, diethylethanolamine, ethanolamine, diethanolamine, and triethanolamine.

9. A process according to claim 4, wherein component (B) of the post-treatment solution is selected from the group consisting of ethylamine, propylamine, isopropylamine, butylamine, dimethylamine, diethylamine, dipropylamine, dibutylamine, triethylamine, tripropylamine, allylamine, diallylamine, triallylamine, dimethylethanolamine, diethylethanolamine, ethanolamine, diethanolamine, and triethanolamine.

10. A process according to claim 3, wherein component (B) of the post-treatment solution is selected from the group consisting of ethylamine, propylamine, isopropylamine, butylamine, dimethylamine, diethylamine, dipropylamine, dibutylamine, triethylamine, tripropylamine, allylamine, diallylamine, triallylamine, dimethylethanolamine, diethylethanolamino, ethanolamine, diethanolamine, and triethanolamine.

11. A process according to claim 2, wherein component (B) of the post-treatment solution is selected from the group consisting of ethylamine, propylamine, isopropylamine, butylamine, dimethylamine, diethylamine, dipropylamine, dibutylamine, triethylamine, tripropylamine, allylamine, diallylamine, triallylamine, dimethylethanolamine, diethylethanolamine, ethanolamine, diethanolamino, and triethanolamine.

12. A process according to claim 1, wherein component (B) of the post-treatment solution is selected from the group consisting of ethylamine, propylamine, isopropylamine, butylamine, dimethylamine, diethylamine, dipropylamine, dibutylamine, triethylamine, tripropylamine, allylamine, diallylamine, triallylamine, dimethylethanolamine, diethylethanolamine, ethanolamine, diethanolamine, and triethanolamine.

* * * * *

UNITED STATES PATENT AND TRADEMARK OFFICE
CERTIFICATE OF CORRECTION

PATENT NO. : 6,395,336 B1
DATED : May 28, 2002
INVENTOR(S) : Honda et al.

It is certified that error appears in the above-identified patent and that said Letters Patent is hereby corrected as shown below:

<u>Title page,</u>
Item [75], Inventors, delete "Hiratsuka"; and insert therefor -- Hiratsuka-Shi, Kanagawa-Ken --; and delete "Sagamihara"; and insert therefor -- Sagamihara-Shi, Kanagawa-Ken --.

<u>Column 12,</u>
Line 24, delete "diethylethanolamino", and insert therefor -- diethylethanolamine --.
Line 32, delete "diethanolamino", and insert therefor -- diethanolamine --.

Signed and Sealed this

Twentieth Day of May, 2003

JAMES E. ROGAN
*Director of the United States Patent and Trademark Office*